| United States Patent [19] | [11] 3,930,018 |
| --- | --- |
| Akasaki et al. | [45] Dec. 30, 1975 |

[54] FEED FOR PISCICULTURE

[75] Inventors: Masato Akasaki, Miyazaki; Hiroshi Takashima; Kazuhiro Shibata, both of Tokyo, all of Japan

[73] Assignee: Mitsubishi Chemical Industries, Ltd., Tokyo, Japan

[22] Filed: Oct. 31, 1973

[21] Appl. No.: 411,198

[30] Foreign Application Priority Data
Nov. 9, 1972  Japan............................... 47-112774

[52] U.S. Cl.................................. 424/322; 424/180
[51] Int. Cl.².......................................... A61K 27/00
[58] Field of Search..................................... 424/322

[56] References Cited
UNITED STATES PATENTS

| 2,302,927 | 11/1942 | Whitmoyer et al.................. 424/180 |
| 2,638,433 | 5/1953 | George ................................ 424/180 |
| 2,767,094 | 10/1956 | Frieden et al....................... 424/180 |

FOREIGN PATENTS OR APPLICATIONS

| 2,010,433 | 2/1970 | France................................ 424/322 |
| 1,224,742 | 3/1971 | United Kingdom................. 424/322 |

OTHER PUBLICATIONS

*Chem. Abstr.*, Vol. 74, (1971), 30883k.

*Primary Examiner*—Frederick E. Waddell
*Attorney, Agent, or Firm*—Oblon, Fisher, Spivak, McClelland & Maier

[57] ABSTRACT

Feeds for pisciculture are enriched with isobutylidene diurea.

8 Claims, No Drawings

FEED FOR PISCICULTURE

BACKGROUND OF THE INVENTION

1. Field of the Invention

This invention relates to a feed additive for pisciculture.

2. Description of the Prior Art

Recently, the heavy demand for animal feeds has increased because of the increase in various animal populations and because of the variety of foods demanded. The limitations of the available food sources has created various difficulties for the multiplication and culture of fowl, domestic animals and fish. Problems in the multiplication and culture of fish (pisciculture) are especially critical because water conditioning has been difficult and because not many suitable feeds are available for fish as compared with the availability of feed. For example, conventional feeds for pisciculture have included a raw mashed fish feed prepared by kneading mashed fish, and a meal mixture consisting of a protein source such as powdered fish, whale meat, or the like and other nutritious components such as carbohydrates, oil and fat, vitamins and the like. However, these conventional feeds have not been suitable nutrient sources from the viewpoint of the proliferation and culturing of fish, especially pisciculture.

A need, therefore, continues to exist for a suitable feed for fish which promotes the proliferation and culturing of fish.

SUMMARY OF THE INVENTION

Accordingly, one object of the present invention is to provide a feed additive for pisciculture or the promotion of the growth of fish.

Briefly, this object and other objects of the invention as hereinafter will become more readily apparent can be attained by providing feeds for the culturing of fish which contain isobutylidene diurea as a growth stimulant.

DESCRIPTION OF THE PREFERRED EMBODIMENTS

The isobutylidene diurea feed additive of the invention can be prepared by the conventional method from isobutyl aldehyde and urea. Isobutylidene diurea has been used as a component for slow release fertilizers, and also as an additive in the feed or ruminant animals. The dosage level of isobutylidene diurea for pisciculture is in the range of 0.1 – 2.0, preferably 0.3 – 1.0 percent by weight per weight of fish i.e., 1–20 g of isobutylidene diurea per one kilogram of fish, in a day. These dosage levels are critical because dosage levels in excess of the upper limit injures the digestive organs of the fish. If the dosage level is too low, the desired effects can not be achieved. Isobutylidene diurea can be fed to fish as is without admixture with other feeds. However, the isobutylidene diurea is preferably made a part of a composite feed prepared by mixing isobutylidene diurea with natural or artificial feeds.

The feed substrates to which isobutylidene diurea can be added include animal feeds such as fish meal, raw fish feed, corn, wheat flour bran and a source of saccharose such as rice bran. It is especially desirable to mix isobutylidene diurea with fish meal, in addition to other additives such as vitamins, carbohydrates, oil and fats, to form the composite feed.

The quantity of isobutylidene diurea in the composite feed usually ranges from 1 – 20% by weight, preferably 3 – 10% by weight. The feed base for the composite feed preferably contains 20 – 90% by weight protein, 1 – 10% by weight fat and oil, 0 – 90% by weight carbohydrate and 0 – 3% by weight vitamins.

The feed of the invention for pisciculture can be fed to fish as a powder or in some other suitable shape by simply adding the feed to the pisciculture medium. Feed pellets can be prepared by adding a binder to the feed ingredients, then kneading and pelletizing the feed as pellets having a diameter of 0.5 – 5 mm and a length of 3 – 10 mm. The composite pisciculture feed can be administered to various fish such as eels, yellow tail, carp, salmon, trout, ayu, crucian, puffer, sea breams, catfish and the like. The feed is especially effective for fish which normally inhabit temperate zones such as eels, yellow tail, carp, sea bream and catfish, especially, carp, sea bream and catfish.

Upon the use of feeds for pisciculture containing the additive of the invention, the growth of fish is remarkably promoted and the weight increase of fish administered the feed is significantly greater than the weight increase of fish grown in conventional pisciculture media. The reason for this is not completely clear. However, it is believed that isobutylidene diurea promotes substantial conversion of the feed into protein while it simultaneously promotes the absorption of nutrients into the digestive organs of fish. Moreover, the residual amounts of isobutylidene diurea which remain in the feeding zones after the fish have been removed promote the growth and proliferation of alga and plankton in the culture zone so that a suitable water environment for fish can be provided.

Having generally described the invention, a further understanding can be obtained by reference to certain specific Examples which are provided herein for purposes of illustration only and are not intended to be limiting in any manner. The percentages shown in the Examples are percentages by weight.

EXAMPLE 1

A commercial powdery meal for frying carp containing 40% protein, 3% fat and oil, 3% fibrin and 12% ash, (manufactured by Taiyo Gyogyo Co.) was admixed with 5% and 10% portions of isobutylidene diurea based on the total weight of the mixture. The powdery meal mixture was admixed with a small amount of locust bean gum and water, and the resulting mixture was pelletized to form pellets having a diameter of 2 – 3 mm and a length of 3 – 10 mm. As a reference composition, the same pellets were prepared without the admixture of isobutylidene diurea. Forty frying carp having a weight of 35 – 45 g were fed with the pelletizing feed for 60 days in a concrete pond having a size of 1 m × 1 m × 2 m. The pelletized feed was administered at 8 – 9 o'clock and at 12 – 1 o'clock every day in such a manner that no feed remained. The weight increase of the fying carp was measured and the results are shown in Table I.

TABLE I

| Pelletized feed | Term (days) | dose (0–60 days) (g) | average weight increase (kg) | feeding efficiency *1 |
|---|---|---|---|---|
| 5% isobutylidene diurea containing feed | 0–30 | 1387 | 1.13 | 0.815 |
| | 31–60 | 3284 | 2.42 | 0.737 |
| | total | 4671 | 3.55 | 0.760 |

TABLE I-continued

| Pelletized feed | Term (days) | dose (0-60 days) (g) | average weight increase (kg) | feeding efficiency *1 |
|---|---|---|---|---|
| 10% isobutylidene diurea containing feed | 0-30 | 1305 | 0.82 | 0.628 |
|  | 31-60 | 3227 | 2.53 | 0.784 |
|  | total | 4532 | 3.35 | 0.739 |
| No isobutylidene diurea containing feed | 0-30 | 1373 | 0.90 | 0.655 |
|  | 31-60 | 3245 | 1.92 | 0.592 |
|  | total | 4618 | 2.82 | 0.611 |

*1 Note — feeding efficiency = average weight increase per 1 kg of feed.

EXAMPLE 2

A commercial powdery pisciculture meal containing 35% protein, 3% fat and oil, 5% fibrin, 13% ash and a small amount of vitamins (manufactured by Nissin Seifun Co.) was admixed with 5% and 10% portions of isobutylidene diurea based on the total weight of the mixture. The mixture was pelletized in accordance with the procedure of Example 1 to prepare a pelletized feed. Two hundred frying sea bream were fed for 47 days with the feed, and the weight increase of the frying seam bream was measured. The results are shown in Table II.

TABLE II

| Feed | Isobutylidene diurea | | |
|---|---|---|---|
|  | 5% | 10% | 0% |
| Average weight (g) initial | 32.25 | 30.15 | 33.35 |
| Average weight (g) after pisciculture | 38.25 | 36.35 | 35.45 |
| Total dose (g) | 956 | 825 | 645 |
| Average weight (g) increase | 6.0 | 6.2 | 2.1 |
| Feeding efficiency | 1.26 | 1.50 | 0.65 |

EXAMPLE 3

Twenty catfish were fed for 60 days with the feed of Example 2 and the weight increase of the catfish was measured and the results are shown in Table III.

TABLE III

| Feed | Isobutylidene diurea | | |
|---|---|---|---|
|  | 5% | 10% | 0% |
| Average weight (g) initial | 42.1 | 39.7 | 38.6 |
| Average weight (g) after pisciculture | 73.8 | 74.9 | 62.3 |
| Total dose (g) | 981 | 990 | 1021 |
| Average weight (g) increase | 31.7 | 35.2 | 23.7 |
| Feeding efficiency | 0.645 | 0.710 | 0.464 |

EXAMPLE 4

A commercial powdery meal for eels containing 47% protein, 10% ash, 5% fat and oil and 5% starch was admixed with 5% isobutylidene diurea and a small amount of water and pellets were formed having a diameter of 2.5 mm. Three hundred ten eels were fed with the pelletized feed for 230 days in a concrete pond having a size of 2m × 4m × 0.75m at 20°- 23°C. As a reference experiment, the same pellets were prepared except that they contained no isobutylidene diurea. The weight increase of eels was measured and the results are shown in Table IV.

TABLE IV

|  | 5% isobutylidene diurea containing feed | No isobutylidene diurea containing feed |
|---|---|---|
| Average weight of eels before feeding (g) | 50.3 | 51.7 |
| Average weight of eels fed for 230 days (g) | 93.0 | 91.0 |
| Total dose of feed (g) | 32.0 | 32.6 |
| Average weight increase (g) | 42.7 | 39.3 |
| Feeding efficiency (%) | 0.00133 | 0.00121 |

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. In a method for feeding catfish for the promotion of growth thereof in a pisciculture, the improvement which compirses: admixing 1–20% by weight of isobutylidene diurea into the feed, and feeding an effective growth promoting amount of the feed to said catfish.

2. The method of claim 1, wherein said feed is a composite of protein, carbohydrate, fat and oil nutrients.

3. The method of claim 2, wherein the feed contains vitamins.

4. The method of claim 1, wherein the feed contains 20 – 90% by weight protein, 1 – 10 % by weight fat and oil, 0 – 90% by weight carbohydrate and 0 – 3 % by weight vitamins.

5. In a method for feeding eels for the promotion of growth thereof in a pisiculture, the improvement which comprises: admixing 1 – 20% by weight of isobutylidene diurea into the feed, and feeding an effective growth-promoting amount of the feed to said eels.

6. The method of claim 5, wherein said feed is a composite of protein, carbohydrate, fat and oil nutrients.

7. The method of claim 6, wherein the feed contains vitamins.

8. The method of claim 5, wherein the feed contains 20 – 90% by weight protein, 1 – 10% by weight fat and oil, 0 – 90% by weight carbohydrate, and 0 – 3% by weight vitamins.

* * * * *